United States Patent
Chen et al.

(10) Patent No.: US 9,239,369 B2
(45) Date of Patent: Jan. 19, 2016

(54) METHOD AND SYSTEM FOR SELECTING BASE STATIONS TO POSITION MOBILE DEVICE

(71) Applicant: NOVATEK Microelectronics Corp., Hsin-Chu (TW)

(72) Inventors: Chien-Sheng Chen, Kaohsiung (TW); Yung-Chuan Lin, Hsinchu (TW); Jium-Ming Lin, Hsinchu (TW)

(73) Assignee: NOVATEK Microelectronics Corp., Hsinchu Science Park, Hsin-Chu (TW)

( * ) Notice: Subject to any disclaimer, the term of this patent is extended or adjusted under 35 U.S.C. 154(b) by 644 days.

(21) Appl. No.: 13/652,492

(22) Filed: Oct. 16, 2012

(65) Prior Publication Data

US 2013/0337845 A1 Dec. 19, 2013

(30) Foreign Application Priority Data

Jun. 18, 2012 (TW) .............................. 101121722 A

(51) Int. Cl.
*H04W 64/00* (2009.01)
*H04W 4/02* (2009.01)
*G01S 5/02* (2010.01)

(52) U.S. Cl.
CPC .............. *G01S 5/0252* (2013.01); *H04W 64/00* (2013.01)

(58) Field of Classification Search
CPC ....................................................... H04W 4/02
See application file for complete search history.

(56) References Cited

U.S. PATENT DOCUMENTS

| | | | | |
|---|---|---|---|---|
| 6,266,014 B1* | 7/2001 | Fattouche | ............. | G01S 5/0009 342/450 |
| 6,556,832 B1* | 4/2003 | Soliman | ................ | H04W 16/18 342/357.31 |
| 7,181,221 B1* | 2/2007 | Mark et al. | ..................... | 455/436 |
| 7,308,418 B2 | 12/2007 | Malek | | |
| 2004/0203841 A1* | 10/2004 | Bayder | ................. | H04W 64/00 455/456.1 |
| 2005/0064879 A1* | 3/2005 | McAvoy | ............... | H04W 64/00 455/456.1 |
| 2008/0104257 A1 | 5/2008 | Olston | | |
| 2008/0125161 A1* | 5/2008 | Ergen | .................... | G01S 5/0289 455/524 |
| 2009/0117851 A1* | 5/2009 | Malaney | ............... | H04W 16/18 455/67.11 |
| 2010/0120422 A1* | 5/2010 | Cheung | ................. | G01S 5/0226 455/434 |
| 2010/0144334 A1* | 6/2010 | Gorokhov | ............. | H04L 5/0035 455/418 |
| 2010/0246544 A1* | 9/2010 | Brisebois | .............. | H04W 24/00 370/338 |
| 2012/0082044 A1* | 4/2012 | Lysejko | ................ | H04W 24/02 370/252 |

FOREIGN PATENT DOCUMENTS

| | | |
|---|---|---|
| TW | I320855 | 2/2010 |
| TW | 201106748 | 2/2011 |
| TW | 201219813 | 5/2012 |

* cited by examiner

*Primary Examiner* — Vladimir Magloire
*Assistant Examiner* — Frank Donado
(74) *Attorney, Agent, or Firm* — Winston Hsu; Scott Margo

(57) ABSTRACT

A method for selecting a plurality of base stations to position a mobile device is provided. The method includes selecting a plurality of base station sets from the plurality of base stations, wherein each of the plurality of base station sets corresponds to a distance matrix, utilizing a first artificial neural network (ANN) unit to select a predefined number of the plurality of base station sets from the plurality of base station sets according to a plurality of distance matrixes corresponding to the plurality of base station sets; and utilizing a second ANN unit to position the mobile device according to the predefined number of the plurality of base station sets.

17 Claims, 11 Drawing Sheets

METHOD AND SYSTEM FOR SELECTING BASE STATIONS TO POSITION MOBILE DEVICE

BACKGROUND OF THE INVENTION

1. Field of the Invention

The present invention relates to a method and a system for selecting a plurality of base stations to position a mobile device, and more particularly, to a method and a system which utilize a plurality of artificial neural network units for selecting a plurality of base stations to be to a plurality of base station sets, so as to position a mobile device.

2. Description of the Prior Art

In the development of wireless communications and the mobile device, it has become an important issue to accurately estimate a current position of the mobile device and to correspondingly provide wireless communication services from a plurality of base stations. In the prior art, the mobile device and its neighboring base stations are utilized to generate a plurality of line-of-sight (LOS) vectors to be taken into an artificial neural network, such as a back-propagation neural network (BPNN), to position the mobile device. Please refer to FIG. 1, which illustrates a schematic diagram of a conventional artificial neural network (ANN) 10. As shown in FIG. 1, the ANN 10 includes an input layer 100, a hidden layer 102 and an output layer 104. The input layer 100 receives the plurality of LOS vectors, the hidden layer 102 processes a calculation, and the output layer 104 outputs an estimated position of the mobile device corresponding to the calculation. The hidden layer 102 of the prior art can utilize a training model to adaptively receive the plurality of LOS vectors for continuous iteration calculation and to adaptively adjust a connective weighting value of the plurality of LOS vectors, so as to complete a training of the ANN 10 for correspondingly outputting the estimated position. However, during the iteration calculation of the prior art, it may result in complicated redundant calculation for the ANN 10 while the ANN 10 receives all the LOS vectors corresponding to the plurality of base stations. In the meanwhile, the complicated redundant calculation is accompanied by longer calculation periods, which is inconvenient for users' practical operation.

SUMMARY OF THE INVENTION

A method and a system for selecting a plurality of base stations to position a mobile device are provided, which can effectively lower the calculation complexity of the ANN and broaden practical application of the position method.

According to an aspect of the disclosure, a method for selecting a plurality of base stations to position a mobile device is provided. The method includes selecting a plurality of base station sets from the plurality of base stations, wherein each of the plurality of base station sets corresponds to a distance matrix, utilizing a first artificial neural network (ANN) unit to select a predefined number of the plurality of base station sets from the plurality of base station sets according to a plurality of distance matrixes corresponding to the plurality of base station sets; and utilizing a second ANN unit to position the mobile device according to the predefined number of the plurality of base station sets.

According to another aspect of the disclosure, a method for selecting a plurality of base stations to position a mobile device is provided. The method includes selecting a plurality of base station sets from the plurality of base stations, wherein each of the plurality of base station sets corresponds to a distance matrix, utilizing a geometric dilution of precision (GDOP) or a weighted geometric dilution of precision (WGDOP) to process a conversion calculation for a first artificial neural network (ANN) unit so as to select a predefined number of the plurality of base station sets from the plurality of base station sets according to a plurality of distance matrixes corresponding to the plurality of base station sets, and utilizing a GDOP or a WGDOP to process a conversion calculation for a second ANN unit so as to position the mobile device according to the predefined number of the plurality of base station sets.

According to further another aspect of the disclosure, a computer system is provided to include a central processing unit, a detection module coupled to the central processing unit for detecting a plurality of base stations neighboring to the computer system, and a storage device coupled to the central processing unit for storing a software and a programming code, wherein the programming code is utilized to instruct the central processing unit to process a method for selecting a plurality of base stations to position a mobile device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
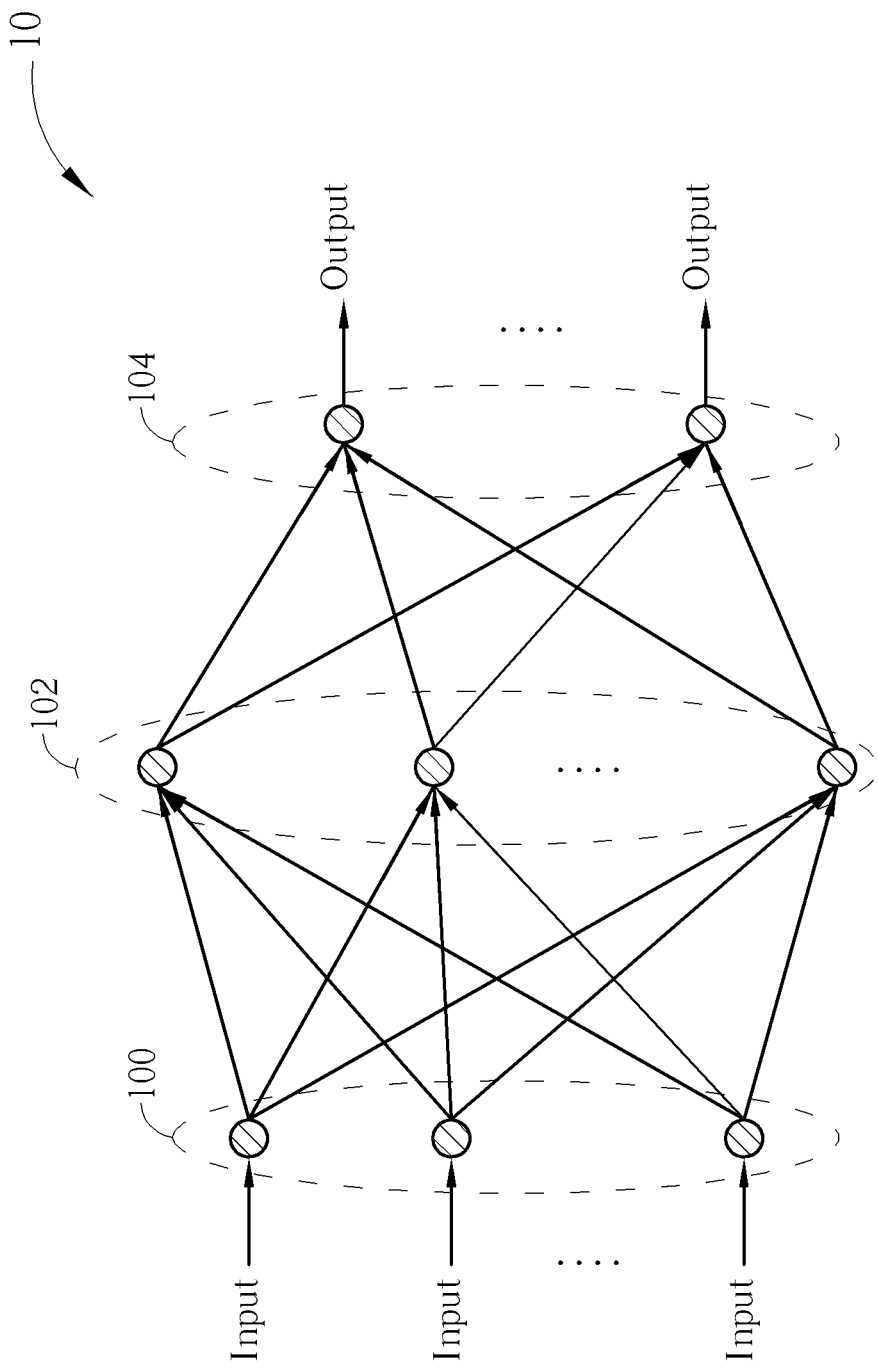
FIG. 1 illustrates a schematic diagram of a conventional artificial neural network (ANN).
Figure 2:
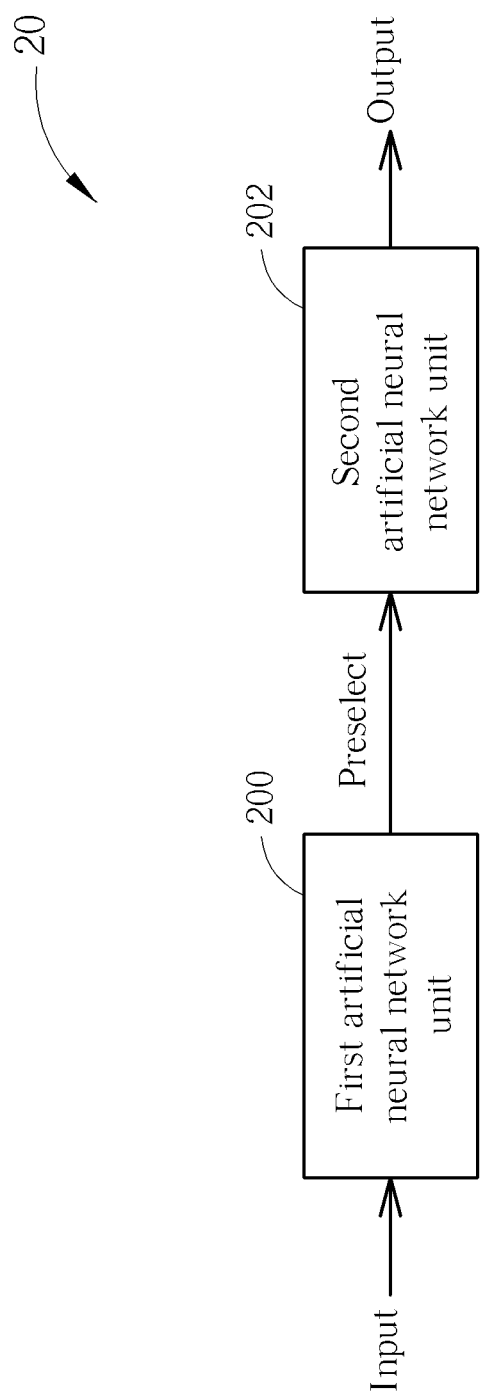
FIG. 2 illustrates a schematic diagram of a positioning system according to an embodiment of the invention.
Figure 3:
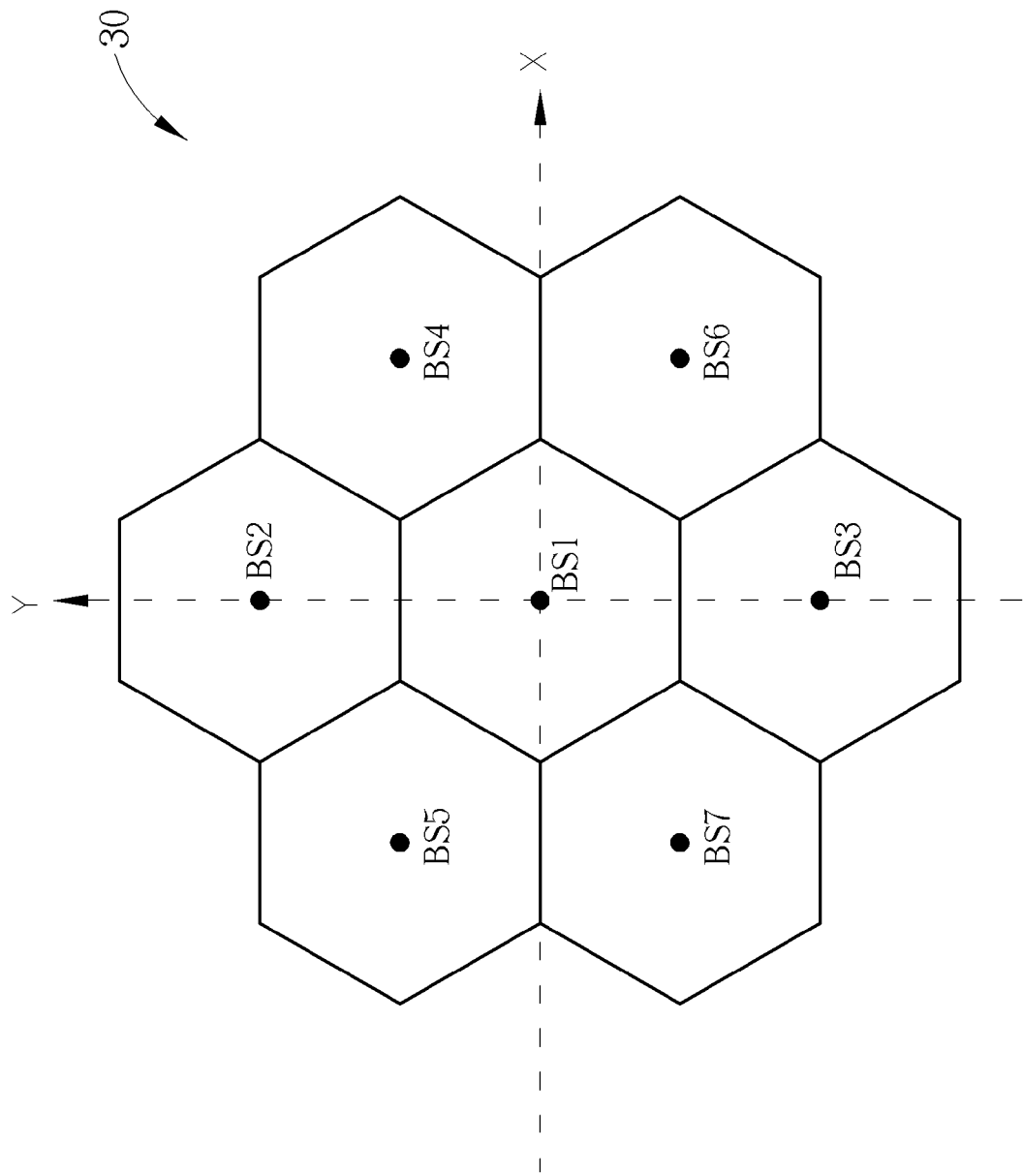
FIG. 3 illustrates a schematic diagram of a cellular communication system applied to the positioning system shown in FIG. 2.

Please refer to FIG. 2 and FIG. 3, wherein FIG. 2 illustrates a schematic diagram of a positioning system 20 according to an embodiment of the invention, and FIG. 3 illustrates a schematic diagram of a cellular communication system 30 applied to the positioning system 20 shown in FIG. 2, wherein FIG. 3 only depicts seven base stations for demonstration. According to different users' requirements, arbitrary numbers of base stations applied to the positioning system 20 can also be in the scope of the invention.

Figure 4:
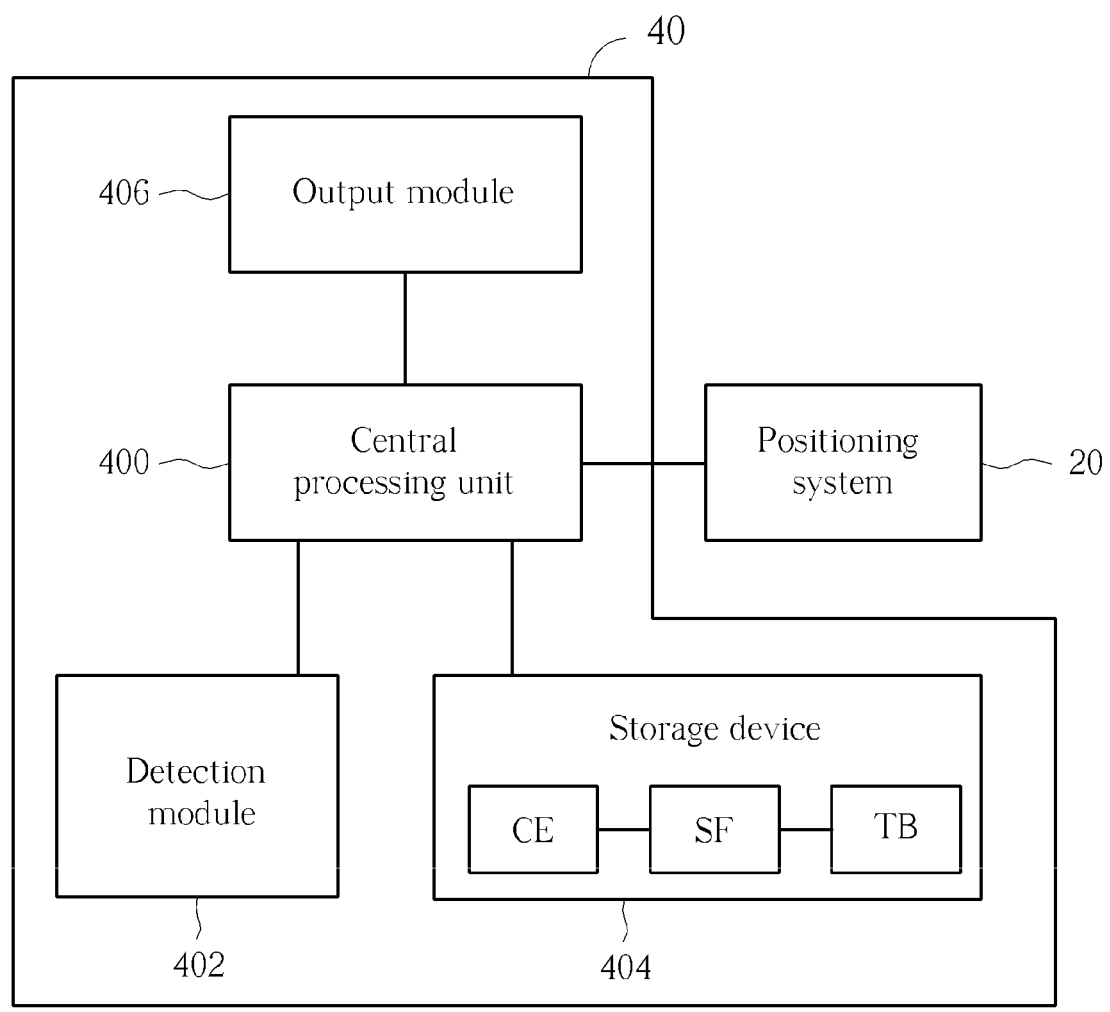
FIG. 4 illustrates a schematic diagram of a computer system according to an embodiment of the invention.

Please refer to FIG. 4, which illustrates a schematic diagram of a computer system 40 according to an embodiment of the invention. As shown in FIG. 4, the computer system 40 includes a central processing unit 400, a detection module 402, a storage device 404 and an output module 406. Noticeably, the positioning system 20 shown in FIG. 2 is coupled to the central processing unit 400 of the computer system 40, and a first artificial neural network (ANN) unit 200 and a second ANN unit 202 of the positioning system 20 can be operated to cooperate with a programming code stored inside the storage device 404, so as to functionally operate the positioning system 20. The central processing unit 400 is coupled to the detection module 402, the storage device 404 and the output module 406, and outputs a control signal to the detection module 402 and the storage device 404. After the computer system 40 initiates, the detection module 402 detects a plurality of available base stations neighboring to the computer system 40, such as the base stations BS1-BS7 shown in FIG. 3, via the control signal. Accordingly, related information corresponding to the base station BS1-BS7, such as related positions/distances between a mobile device and the base stations BS1-BS7 or transmission rate of the base stations BS1-BS7, are stored inside the storage device 404 as a look-up table TB for utilization of the first ANN unit 200 or the second ANN unit 202. The programming code CP inside the storage device 404 correspondingly instructs the first ANN unit 200 or the second ANN unit 202 via the control signal, and cooperates with software SF stored inside the computer system 40, like an operational system, to process calculation of the first ANN unit 200 or the second ANN unit 202, respectively. Lastly, the output module 406 outputs a calculation result of the first ANN unit 200 and/or the second ANN unit 202. If the calculation result belongs to the first ANN unit 200, the calculation result should be a geometric dilution of precision (GDOP) or a weighted geometric dilution of precision (WGDOP). If the calculation result belongs to the second ANN unit 202, the calculation result should be an estimated position of the mobile device.

Please refer to FIG. 2 again. The positioning system 20 includes the first ANN unit 200 and the second ANN unit 202, and the detection module 402 generates a detection result, which is obtained from the neighboring base stations BS1-BS7, to be inputted into the first ANN unit 200. Accordingly, the first ANN unit 200 processes the GDOP/WGDOP calculation for selecting a plurality of base stations from the base stations BS1-BS7. Next, the second ANN unit 202 receives the selected base stations from the first ANN unit 200 to process the GDOP/WGDOP calculation accompanying an algorithm, so as to position the mobile device. In other words, the first ANN unit 200 is operated as a pre-selection operation to select the proper base stations from all the base stations, and the second ANN unit 202 utilizes the proper base stations from the first ANN unit 200 to position the mobile device. In that, the positioning system 20 of the invention has provided a lower calculation complexity of the ANN units to increase practical application of the positioning system 20 for efficient positioning the mobile device.

Suppose the positioning system 20 is a three dimensional space including the X-axis, the Y-axis and the Z-axis, and the three axis variables will be considered in the following process. Certainly, if the positioning system 20 is a two dimensional space including the X-axis and the Y-axis, the corresponding two axis variables will be considered for the following process instead.

First of all, it begins to define the GDOP calculation. Suppose the base station BS7 is a serving base station to provide a wireless communication service for the mobile device, and each of the base stations BS1-BS7 corresponding to the mobile device derives a relative distance $r_i$, as shown in equation (1)

$$r_i = \sqrt{(x-X_i)^2+(y-Y_i)^2+(z-Z_i)^2}+C \cdot t_b+v_{ri} \tag{1}$$

wherein the coordinates (x, y, z) and (X, Y, Z) represent the position of the mobile device and the i-th base station, C represents the light speed, $t_b$ represents a time offset, and $v_{ri}$ represents a pseudo-range measurements noise. Further, equation (1) can be linearized by taking Taylor series expansion around an approximate mobile device position $(\hat{x}, \hat{y}, \hat{z})$ and correspondingly neglecting higher order terms, such that equation (2) is obtained:

$$\Delta r_i = r_i - \hat{r}_i \approx e_{i1}\delta_x + e_{i2}\delta_y + e_{i3}\delta_z + C \cdot t_b + v_{ri} \tag{2}$$

wherein $(\delta_x, \delta_y, \delta_z)$ are coordinate offsets of coordinate (x, y, z), respectively, symbols shown in equation (2) are $$e_{i1} = \frac{\hat{x}-X_i}{\hat{r}_i}, \quad e_{i2} = \frac{\hat{y}-Y_i}{\hat{r}_i}, \quad e_{i3} = \frac{\hat{z}-Z_i}{\hat{r}_i},$$

and $\hat{r}_i = \sqrt{(\hat{x}-X_i)^2+(\hat{y}-Y_i)^2+(\hat{z}-Z_i)^2}$, and $(e_{i1}, e_{i2}, e_{i3})$ with i=1, 2, . . . , n can represent the LOS vectors between the mobile device and the base stations. Next, applying $z=H\delta+v$ with $$z = \begin{bmatrix} r_1 - \hat{r}_1 \\ r_2 - \hat{r}_2 \\ \vdots \\ r_n - \hat{r}_n \end{bmatrix}, \delta = \begin{bmatrix} \delta_x \\ \delta_y \\ \delta_z \\ c \cdot t_b \end{bmatrix}, \begin{bmatrix} v_{r1} \\ v_{r2} \\ \vdots \\ v_m \end{bmatrix}$$

to have $$H = \begin{bmatrix} e_{11} & e_{12} & e_{13} & 1 \\ e_{21} & e_{22} & e_{23} & 1 \\ \vdots & \vdots & \vdots & \vdots \\ e_{n1} & e_{n2} & e_{n3} & 1 \end{bmatrix},$$

equation (3) of the GDOP is obtained:

$$\text{GDOP} = \sqrt{tr(H^T H)^{-1}} \tag{3}$$

Noticeably, if a user chooses the WGDOP for replacing the GDOP to process the calculation, a weighting matrix, $$W = \begin{bmatrix} 1/\sigma_1^2 & 0 & 0 & 0 & 0 \\ 0 & 1/\sigma_2^2 & 0 & 0 & 0 \\ 0 & 0 & 1/\sigma_3^2 & 0 & 0 \\ 0 & 0 & 0 & \ddots & 0 \\ 0 & 0 & 0 & 0 & 1/\sigma_n^2 \end{bmatrix} = \begin{bmatrix} k_1 & 0 & 0 & 0 & 0 \\ 0 & k_2 & 0 & 0 & 0 \\ 0 & 0 & k_3 & 0 & 0 \\ 0 & 0 & 0 & \ddots & 0 \\ 0 & 0 & 0 & 0 & k_n \end{bmatrix},$$

can be added into equation (3), wherein $\sigma_i^2$ represents a variance of measurement error, such that equation (4) is obtained for representing the WGDOP:

$$\text{WGDOP} = \sqrt{tr(H^T W H)^{-1}} \tag{4}$$

In the embodiment, n=7 (i.e. BS1-BS7), the positioning system 20 is in the three dimensional space, and the first ANN unit 200 is operated via the WGDOP calculation. Thus, the base stations BS1-BS7 are divided into different groups by $C_4^7$ to have 35 base station sets, i.e. every four base stations form a base station set to have 35 base station sets in all. Each of the base station sets corresponds to a distance matrix H shown in equation (3), and each of the distance matrixes corresponds to a matrix eigenvalue λ. Then, the first ANN unit 200 is operated to process a conversion calculation via equations (5)-(10).

$$f_1(\lambda) = \lambda_1 + \lambda_2 + \lambda_3 + \lambda_4 = \text{trace}(H^T WH) \quad (5)$$

$$f_2(\lambda) = \lambda_1^2 + \lambda_2^2 + \lambda_3^2 + \lambda_4^2 = \text{trace}[(H^T WH)^2] \quad (6)$$

$$f_3(\lambda) = \lambda_1^3 + \lambda_2^3 + \lambda_3^3 + \lambda_4^3 = \text{trace}[(H^T WH)^3] \quad (7)$$

$$f_4(\lambda) = \lambda_1 \lambda_2 \lambda_3 \lambda_4 = \det(H^T WH) \quad (8)$$

$$H^T WH = \begin{bmatrix} B_{11} & B_{12} & B_{13} & B_{14} \\ & B_{22} & B_{23} & B_{24} \\ & & B_{33} & B_{34} \\ sym & & & B_{44} \end{bmatrix} \quad (9)$$

$$WGDOP = \sqrt{tr(H^T WH)^{-1}} = \sqrt{\lambda_1^{-1} + \lambda_2^{-1} + \lambda_3^{-1} + \lambda_4^{-1}} \quad (10)$$

Figure 5A:
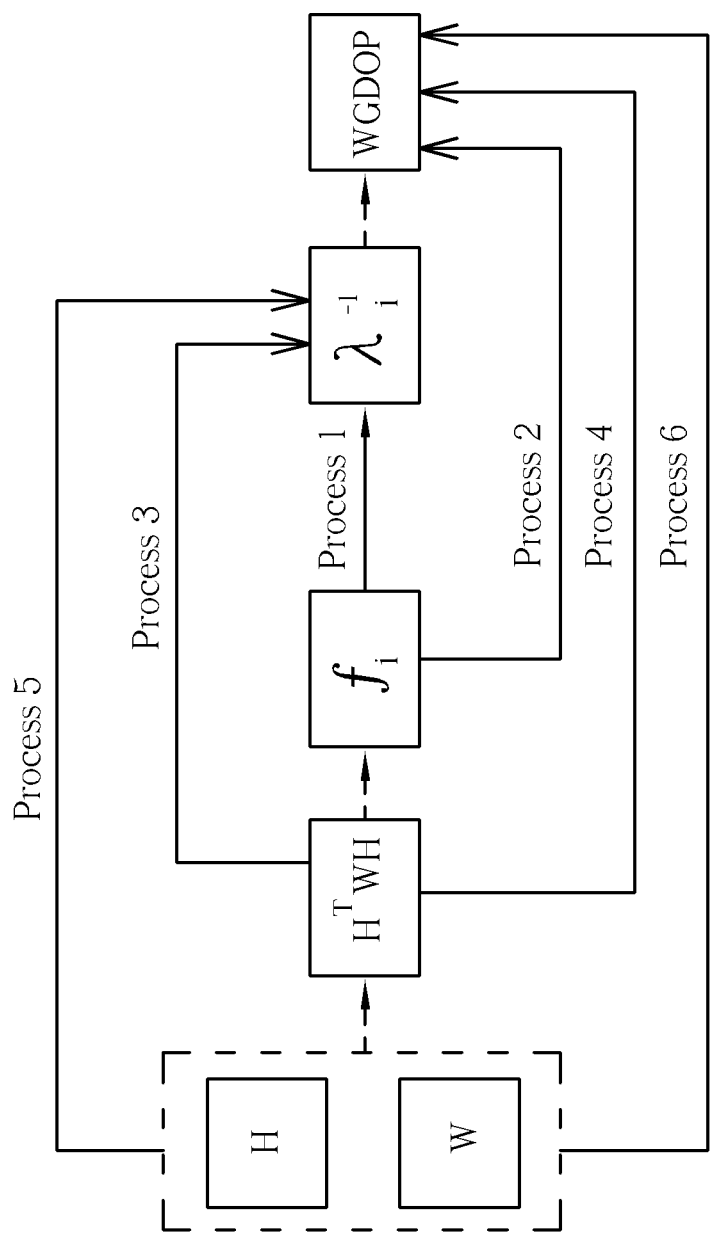
FIG. 5A illustrates a schematic diagram of six training process via the WGDOP for the first ANN unit according to an embodiment of the invention.

Accordingly, please refer to FIG. 5A, which illustrates a schematic diagram of six training process via the WGDOP for the first ANN unit 200 according to an embodiment of the invention. The six training processes are as follows:

Process 1:
Input $(f_1, f_2, f_3, f_4)^T$, output $(\lambda_1^{-1}, \lambda_2^{-1}, \lambda_3^{-1}, \lambda_4^{-1})^T$;
Process 2:
Input $(f_1, f_2, f_3, f_4)^T$, output WGDOP;
Process 3:
Input $(B_{11}, B_{12}, B_{13}, B_{14}, B_{22}, B_{23}, B_{24}, B_{33}, B_{34}, B_{44})^T$, output $(\lambda_1^{-1}, \lambda_2^{-1}, \lambda_3^{-1}, \lambda_4^{-1})^T$;
Process 4:
Input $(B_{11}, B_{12}, B_{13}, B_{14}, B_{22}, B_{23}, B_{24}, B_{33}, B_{34}, B_{44})^T$, output WGDOP;
Process 5:
Input $(e_{11}, e_{12}, e_{13}, e_{21}, e_{22}, e_{23}, e_{31}, e_{32}, e_{33}, e_{41}, e_{42}, e_{43}, k_1, k_2, k_3, k_4)^T$, output $(\lambda_1^{-1}, \lambda_2^{-1}, \lambda_3^{-1}, \lambda_4^{-1})^T$;
Process 6:
Input $(e_{11}, e_{12}, e_{13}, e_{21}, e_{22}, e_{23}, e_{31}, e_{32}, e_{33}, e_{41}, e_{42}, e_{43}, k_1, k_2, k_3, k_4)^T$, output WGDOP.

Therefore, the first ANN unit 200 can be operated to finish one of the six training processes according to different users' requirements, so as to obtain the trained first ANN unit 200 which has finished the conversion calculation. Accordingly, WGDOP values corresponding to the 35 base station sets are obtained. Next, the 35 WGDOP values are sequentially arranged from the small to the big in order to choose the smallest three WGDOP values and the three base station sets thereof. For example, the three base station sets can be (BS1, BS2, BS3, BS7), (BS2, BS3, BS5, BS7) and (BS1, BS3, BS6, BS7). Since the base station BS7 is the serving base station, the base station BS7 will certainly be chosen by the first ANN unit 200 and inputted into the second ANN unit 202 under the pre-selection operation. In other words, the pre-selection operation eliminates the base station BS7 from the seven base stations BS1-BS7 for simplicity, and chooses three base stations from the six base stations BS1-BS6, i.e. processing the division by $C_3^6$ to have twenty base station sets. Next, the twenty base station sets with the base station BS7 are inputted into the first ANN unit 200 for the same arrangement process to choose the three smallest WGDOP values and the three base station sets thereof, such as (BS1, BS2, BS3, BS7), (BS1, BS3, BS4, BS7) and (BS2, BS3, BS4, BS7), so as to simplify the calculation complexity. As can be see, the selected base stations as well as the serving base station are combined to be the three base station sets including five different base stations. Noticeably, the embodiment demonstrates a predefined number as three hereinafter, and those skilled in the arts can arbitrarily choose other predefined number according to different requirements.

Figure 5B:
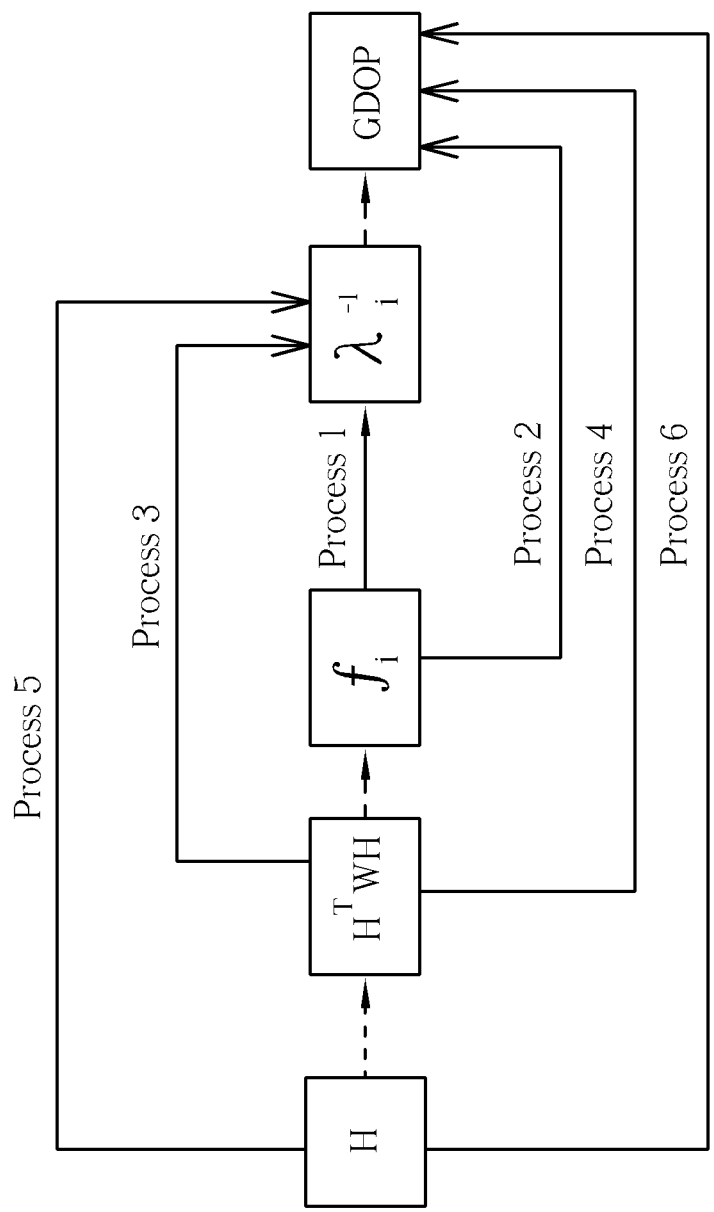
FIG. 5B illustrates a schematic diagram of six training processes via the GDOP for the first ANN unit according to an embodiment of the invention.

Please refer to FIG. 5B, which illustrates a schematic diagram of six training processes via the GDOP for the first ANN unit 200 according to an embodiment of the invention. As shown in FIG. 5B, the six training processes for the first ANN unit 200 are similar to the six training processes shown in FIG. 5A, and can be referenced from FIG. 5A to choose the predefined number, such as three, of the base station sets, so as to be the input parameters of the second ANN unit 202. Besides, the second ANN unit 202 can also be trained with the similar training process applied to the first ANN unit 200, such as the WGDOP or the GDOP, and cooperate with a scaled conjugate gradient (SCG) algorithm, so as to position the mobile device. Unlike the first ANN unit 200, the second ANN unit 202 will output the estimated position of the mobile device after completing the conversion calculation.

In addition, the first ANN unit 200 and the second ANN unit 202 include an input layer, a hidden layer and an output layer. The hidden layer further includes a plurality of hidden sub-layers and a plurality of hidden neurons, and a plurality of epochs are utilized to determine a conversion period of the first ANN unit 200 and the second ANN unit 202. Those skilled in the art can adaptively modify different conditions of the hidden layer to combine with the embodiment of the invention, so as to obtain the proper calculation result for different requirements, which is also in the scope of the invention.

Figure 6:
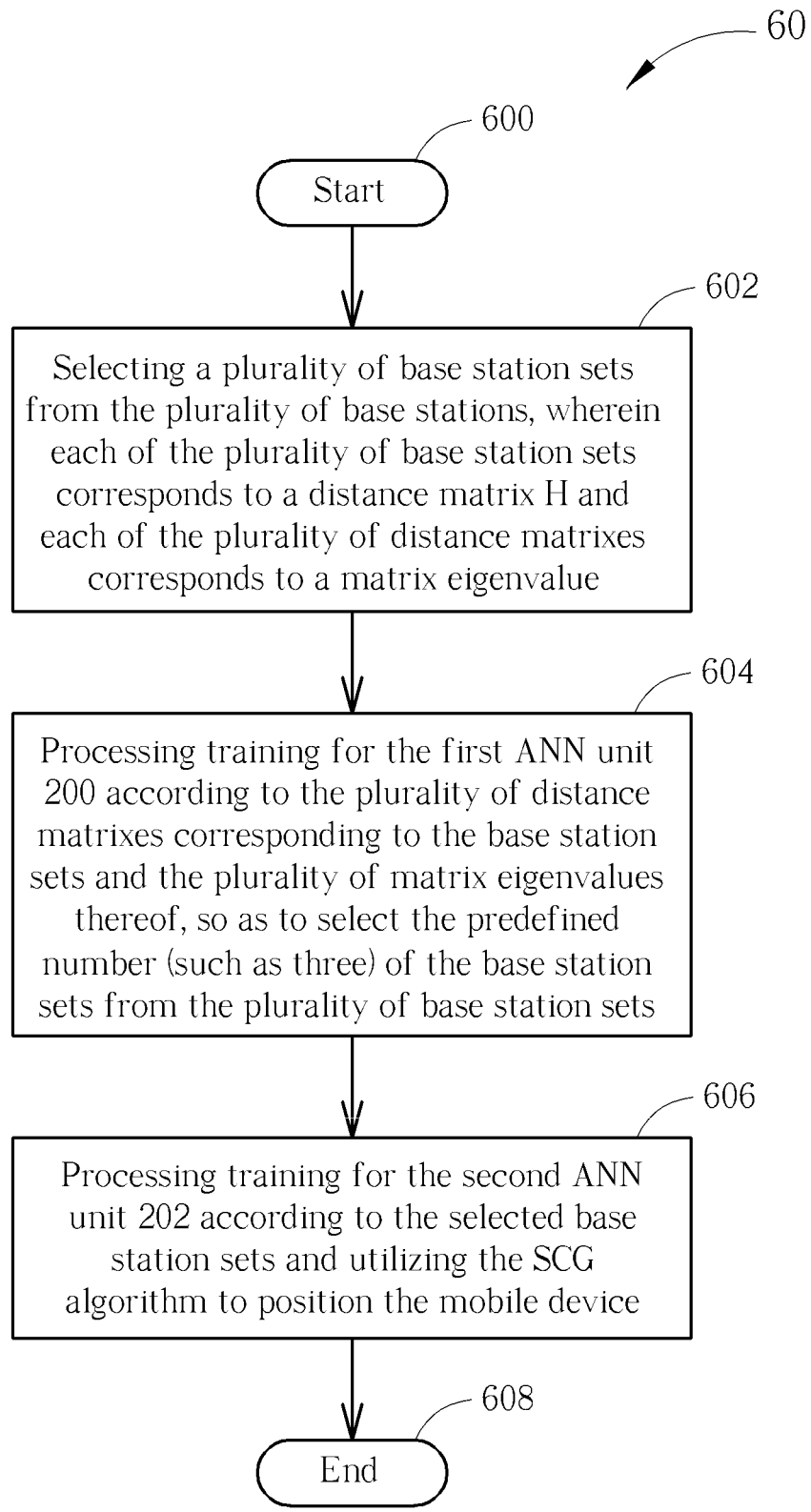
FIG. 6 illustrates a flow chart of a positioning process according to an embodiment of the invention.

The method applying to the positioning system 20 for positioning the mobile device can be derived into a positioning process 60, as shown in FIG. 6. The positioning process 60 includes the steps as follows:

Step 600: Start.

Step 602: Selecting a plurality of base station sets from the plurality of base stations, wherein each of the plurality of base station sets corresponds to a distance matrix H and each of the plurality of distance matrixes corresponds to a matrix eigenvalue.

Step 604: Processing training for the first ANN unit 200 according to the plurality of distance matrixes corresponding to the base station sets and the plurality of matrix eigenvalues thereof, so as to select the predefined number (such as three) of the base station sets from the plurality of base station sets.

Step 606: Processing training for the second ANN unit 202 according to the selected base station sets and utilizing the SCG algorithm to position the mobile device.

Step 608: End.

In the embodiment, the positioning process 60 is applied to the cellular communication system shown in FIG. 3. First of all, in Step 602, the plurality of base stations are divided into different groups to obtain the plurality of distance matrixes corresponding to different base station sets and the plurality of matrix eigenvalues thereof. In Step 604, the first ANN unit 200 is trained to obtain the three base station sets. In Step 606, the selected three base station sets are inputted into the second ANN unit 202 to complete training of the second ANN unit 202, and the SCG algorithm is simultaneously utilized with the trained second ANN unit 202 to position the mobile device. Details of Step 602 to Step 606 can be referenced from FIG. 2 to FIG. 5 and related paragraphs thereof, which is not described hereinafter. Besides, those skilled in the art can adaptively modify the operation of Step 604 to select the plurality of the base station sets rather than the predefined number of the base station sets after the first ANN unit 200 has been trained, wherein the predefined number three is not limiting the scope of the embodiment to train the second ANN unit 202. In other words, Step 604 can be modified with any particular number according to different users' requirements.

Moreover, the user can utilize the positioning process 60 with other algorithms or related hardware devices, so as to apply to a global positioning system (GPS), a wireless sensor network (WSN) or a femtocell, which is also in the scope of the invention.

Additionally, the above positioning method shown in FIG. 6 can be realized via different embodiments. In one embodiment, a computer readable recording medium including a plurality of instructions is utilized for instructing a processor (i.e. a central processing unit) to operate the positioning method. Also, the computer readable recording medium can be the form of the ROM, the flash memory, the floppy disk, the hard disk, the CD, the USB, the magnetic tape, the database accessible by the network or any other similar storage medium familiar with those skilled in the art. In other embodiments, the positioning method shown in FIG. 6 can also be realized in a form of a computer programming product, which can be functionally operated once a computer has installed the computer programming product to process the plurality of instructions, so as to process the positioning method. Preferably, the computer programming product can be stored inside a computer readable recording medium or transmitted via the network.

Figure 7:
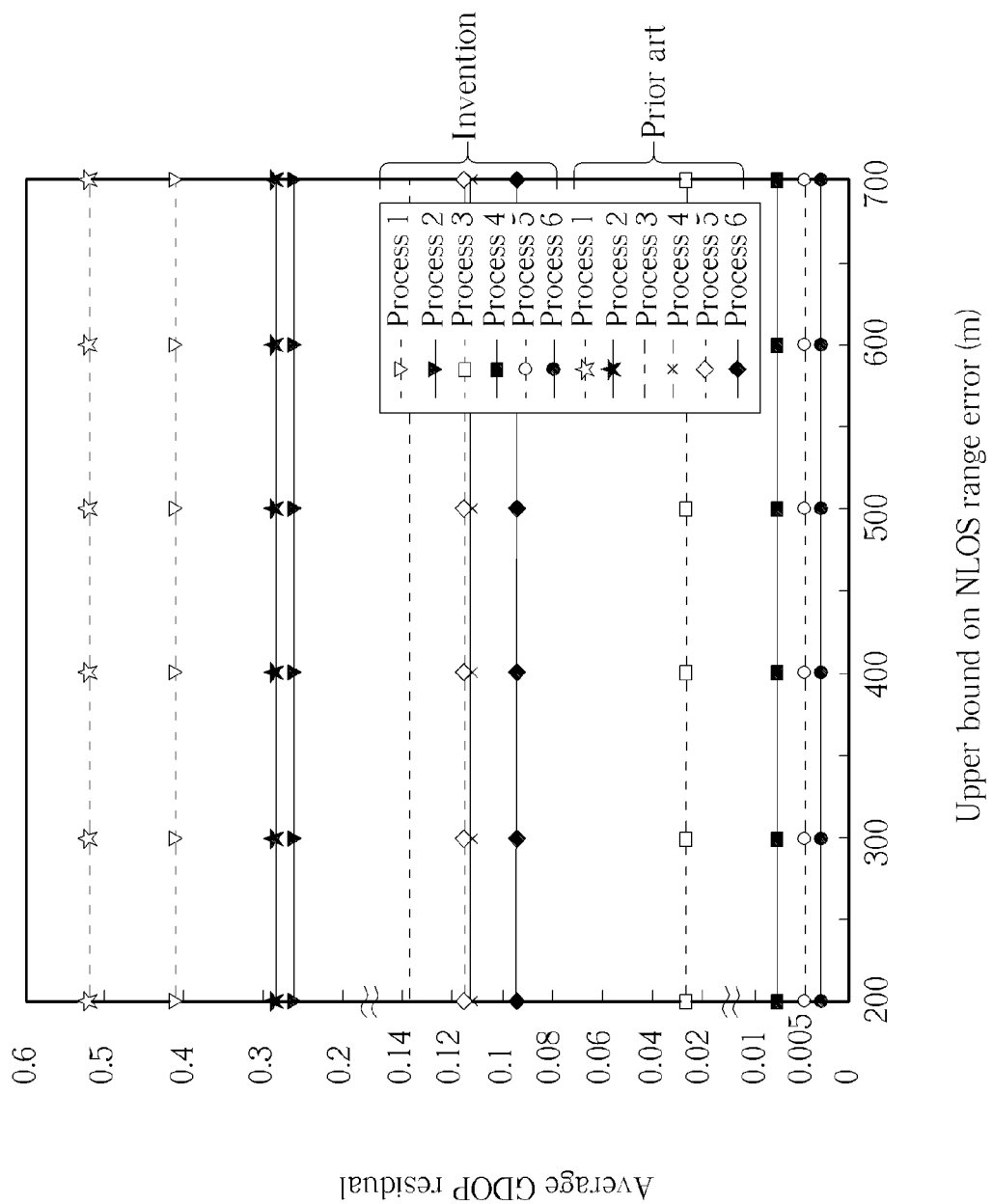
FIG. 7 illustrates a schematic diagram of a simulation comparison between the prior art and the invention.

The positioning system 20 and the positioning process 60 of the invention utilize the trained first ANN unit 200 and the trained second ANN unit 202 to cooperate with the SCG algorithm, so as to estimate the position of the mobile device. To compare with the prior art like the BPNN, the embodiment of the invention has provided a better accurate position estimation as well as a shorter calculation period. Please refer to FIG. 7, which illustrates a schematic diagram of a simulation comparison between the prior art and the invention. As shown in FIG. 7, the prior art (BPNN) is operated under conditions with 6000 epochs and a 0.02 learning rate, and the embodiment of the invention is operated under conditions with 2000 epochs. With an upper bound on NLOS range error, an average GDOP residual is calculated for comparing the prior art and the embodiment of the invention. Once the user processes the six training processes provided in the embodiment of the invention, the prior art will have a larger average GDOP residual value than the embodiment of the invention. In other words, the embodiment of the invention utilizing the SCG algorithm can utilize fewer epochs to obtain smaller average GDOP residual values, so as to reduce the calculation complexity as well as to shorter the calculation period.

Figure 8:
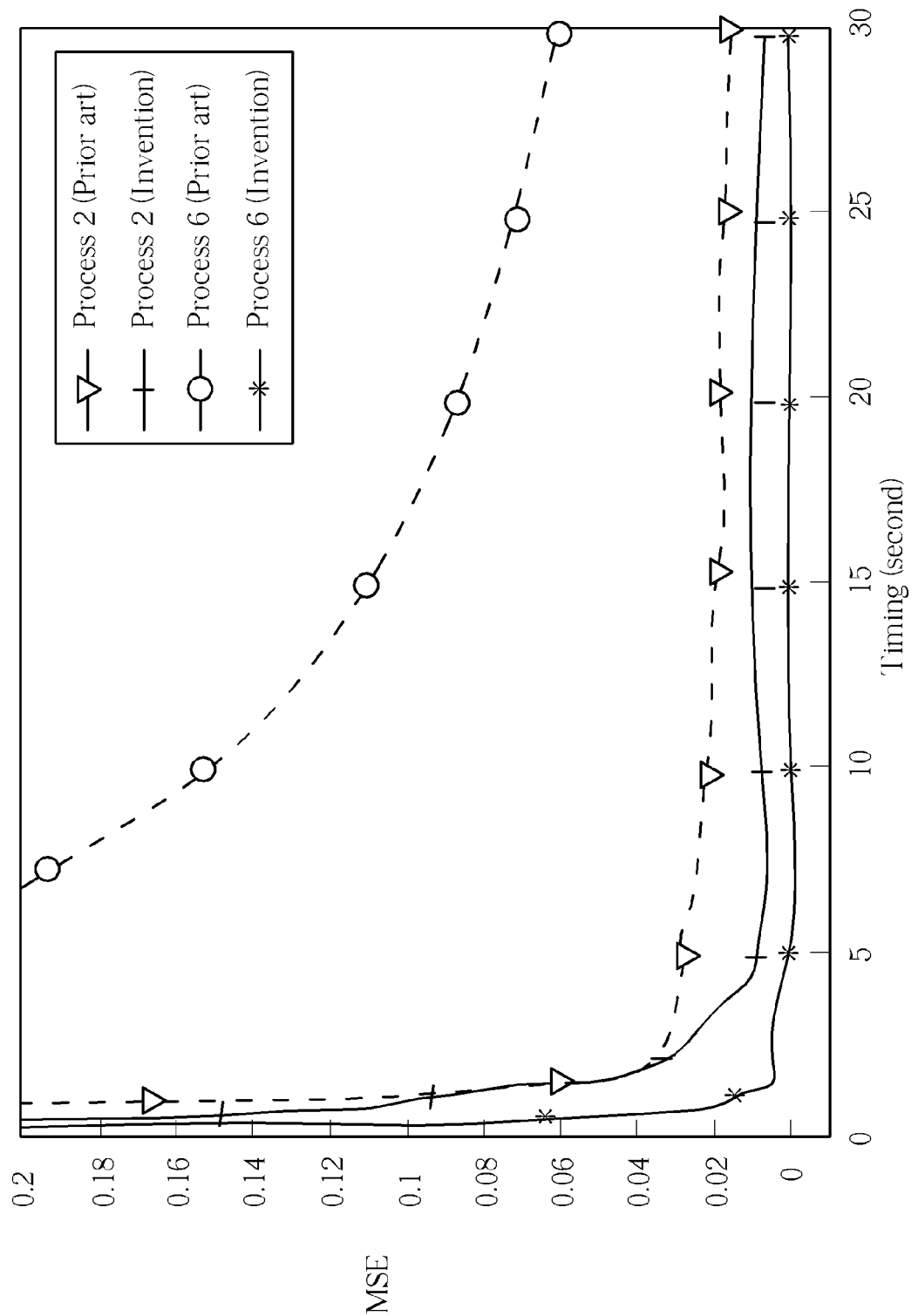
FIG. 8 illustrates another schematic diagram of a simulation comparison between the prior art and the invention.

Furthermore, please refer to FIG. 8, which illustrates another schematic diagram of a simulation comparison between the prior art and the embodiment of the invention. In simple, the embodiment of the invention and the prior art are applied to partial training processes, such as the process 2 and the process 6. Also, another comparison parameter, a mean-square error (MSE), is introduced to compare differences between the embodiment of the invention (SCG) and the prior art (BPNN). The MSE can be utilized to calculate variation of the GDOP value waiting for awhile as a conversion period, as shown in equation (11):

$$MSE = \frac{1}{N}\sum_{i=1}^{N}(GDOP_a - GDOP_e)^2, \quad (11)$$

wherein N represents the number of epochs. As shown in FIG. 8, the prior art has the larger MSE value than the invention after the same training periods through different processes, and the consequence can also be obtained in the other training processes. In other words, the embodiment of the invention (SCG) can reduce the calculation complexity to obtain a faster conversion calculation within shorter periods.

Figure 9:
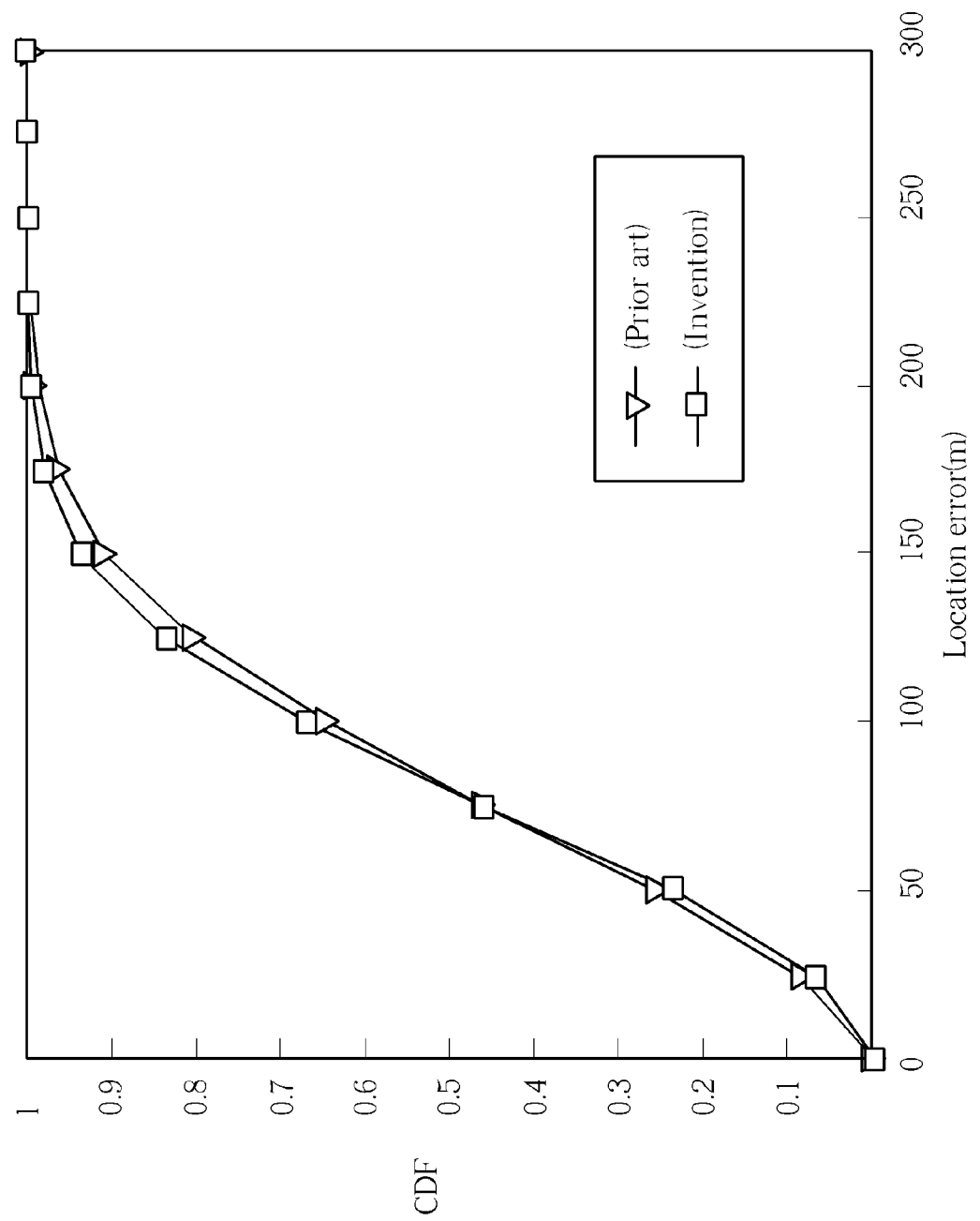
FIG. 9 illustrates another schematic diagram of a simulation comparison between the prior art and the invention.

Please refer to FIG. 9, which illustrates another schematic diagram of a simulation comparison between the prior art and the invention. Hereinafter, a cumulative distribution function (CDF) is provided to demonstrate differences between the prior art and the embodiment of the invention. The embodiment of the invention preselects three of the base stations to combine the serving base station, so as to position the mobile device. In contrast, the prior art directly utilizes all of the neighboring base stations for positioning. Consequently, a smaller location error of the embodiment of the invention can be obtained than the prior art under the same CDF. In other words, the embodiment of the invention chooses the proper base stations from all the base stations, in advance, so as to position the mobile device with higher accuracy.

Besides, the positioning system 20 and the positioning process 60 of the invention are both applied to the three dimensional space including the X-axis, the Y-axis and the Z-axis for practical realization. Certainly, the user can modify the similar conception for the positioning system 20 and the positioning process 60 to be applied to the two dimensional space including such as the X-axis and the Y-axis. Under such circumstances, adjustments for the distance matrixes corresponding to the base station sets are needed to eliminate the related Z-axis parameters, such that the plurality of adjusted distance matrixes and the plurality of matrix eigenvalues are obtained, which is also in the scope of the invention.

Preferably, the embodiment of the invention simultaneously utilizes the first ANN unit 200 and the second ANN unit 202 of the positioning system 20 for positioning, and the calculation of the first ANN unit 200 and the second ANN unit 202 can also be derived into another programming code (not shown in the figure) to be combined with the programming code CP stored in the storage device 404, so as to cooperate with the software SF of the computer system 40 for positioning the mobile device. Further, the embodiment of the invention can also directly utilize the look-up table TB as well as the second ANN unit 202, so as to cooperate with the software SF of the computer system 40 for positioning the mobile device. In the storage device 404, the positioning system 20 can periodically encode the trained first ANN unit 200 and the trained second ANN unit 202, i.e. both the first ANN unit 200 and the second ANN unit 202 have finished the conversion calculation, into a conversion programming code (not shown in the figure) to periodically refresh the programming code CP in the storage device 404, so as to increase the calculation efficiency as well as range of application, which is also in the scope of the invention.

Figure 10:
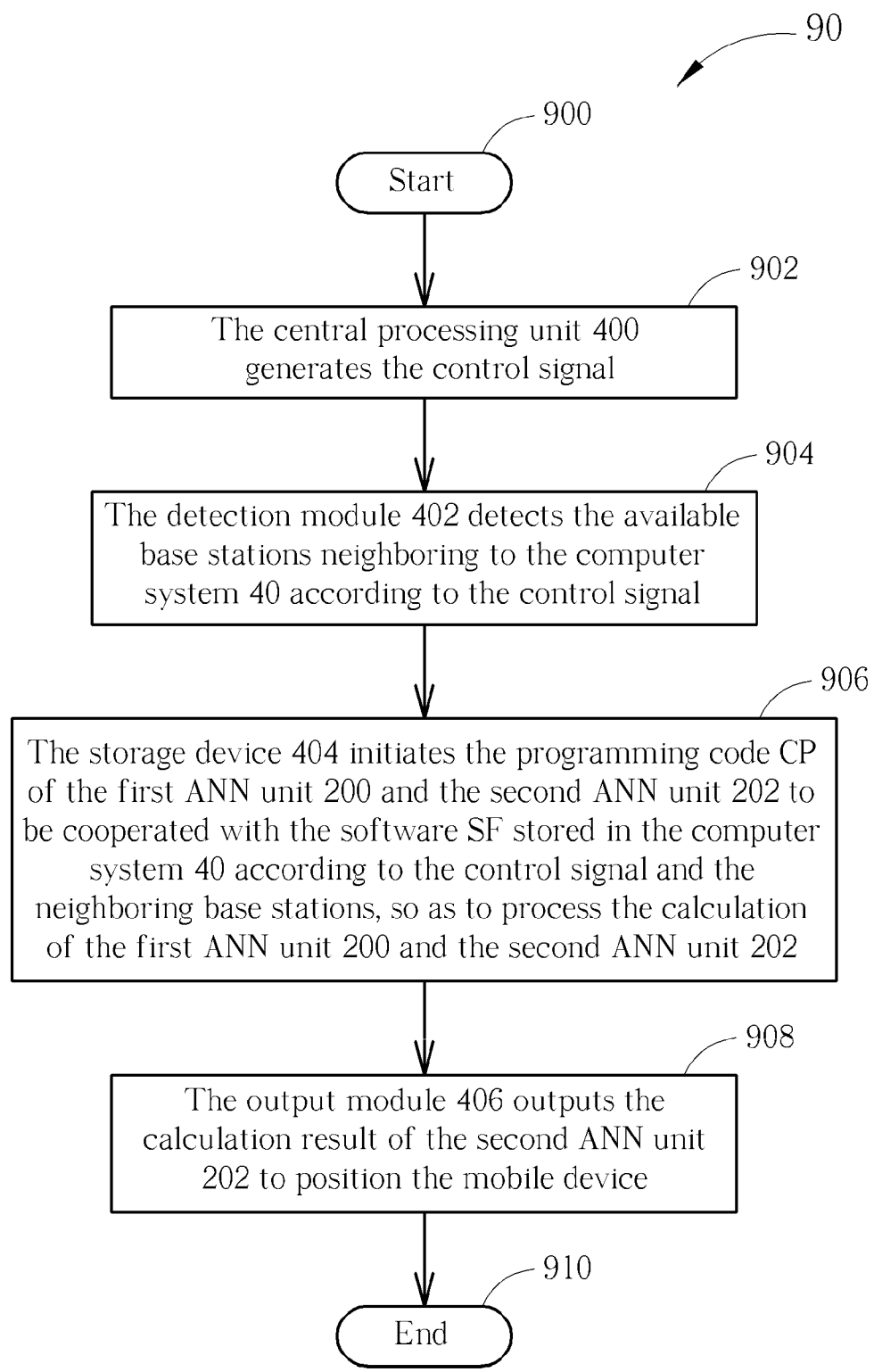
FIG. 10 illustrates a flowchart of another positioning process according to an embodiment of the invention.

Further, the computer system 40 in the invention can be summarized as a positioning process 90, as shown in FIG. 10. The positioning process 90 includes the steps as follows:

Step 900: Start.

Step 902: The central processing unit 400 generates the control signal.

Step 904: The detection module 402 detects the available base stations neighboring to the computer system 40 according to the control signal.

Step 906: The storage device 404 initiates the programming code CP of the first ANN unit 200 and the second ANN unit 202 to be cooperated with the software SF stored in the computer system 40 according to the control signal and the neighboring base stations, so as to process the calculation of the first ANN unit 200 and the second ANN unit 202.

Step 908: The output module 406 outputs the calculation result of the second ANN unit 202 to position the mobile device.

Step 910: End.

Since details of the positioning process 90 can be referenced from the positioning system 20, the computer system 40, FIG. 2 to FIG. 6 and related paragraphs thereof, they are not described hereinafter. Noticeably, in Step 906, the calculation (or the conversion calculation) of the first ANN unit 200 and the second ANN unit 202 can adaptively add another iterative calculation to increase accuracy for positioning the mobile device. In Step 908, the output module 406 can initially output the calculation result of the first ANN unit 200 for adaptive correction of the user, and accordingly, the calculation result of the first ANN unit 200 can be inputted into the second ANN unit 202 to position the mobile device, which is also in the scope of the invention. In the meanwhile, the mentioned conversion programming code and the look-up table TB can also be adaptively modified to cooperate with Step 906 or Step 908, so as to increase the calculation efficiency as well as range of application of the positioning system 20.

Noticeably, the mentioned embodiments mainly focus on construction of two ANN units to position the mobile device. Certainly, more ANN units serially coupled to each other can also be utilized in other embodiments, and each of the ANN units can be operated to choose a predefined number of the base stations. Until the last ANN unit receives the predefined number of the base stations, the position of the mobile device can be obtained.

In summary, the embodiments provide a positioning method including double layers in a artificial neural network (ANN), wherein a first ANN unit is utilized to process a pre-selection to choose the proper base station sets from the plurality of base stations, and a second ANN unit is utilized to receive the proper base station sets to position the mobile device. Moreover, the embodiments of the invention combine multiple training processes to adaptively train the first ANN unit as well as the second ANN unit, and cooperate with the SCG algorithm for mobile device positioning. Also, the positioning method can be interpreted into a programming code to be combined with a computer system for the positioning. In comparison with the prior art, the embodiments can effectively lower the calculation complexity of the ANN units to correspondingly reduce the calculation periods as well as the conversion periods, so as to broaden the application field of the positioning method.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for selecting a plurality of base stations to position a mobile device comprising:
    forming y base station combinations from n base stations taken r base stations at a time, where $y=C_r^n$, and taking the y base station combinations as a plurality of base station sets, each base station set corresponding to a respective distance matrix comprising a plurality of vectors each between the mobile device and a respective one of base stations in the base station set;
    utilizing a first artificial neural network (ANN) unit to select a predefined number of base station sets from the plurality of base station sets according to a plurality of distance matrixes corresponding to the plurality of base station sets; and
    utilizing a second ANN unit to position the mobile device according to the predefined number of base station sets.

2. The method of claim 1, wherein the predefined number is three.

3. The method of claim 2, wherein the predefined number of base station sets comprises at least five base stations without repetition.

4. The method of claim 1, wherein the step of utilizing the first ANN unit to select the predefined number of base station sets from the plurality of base station sets according to the plurality of distance matrixes corresponding to the plurality of base station sets, further comprises:
    utilizing a geometric dilution of precision (GDOP) or a weighted geometric dilution of precision (WGDOP) to process a conversion calculation for the first ANN unit, so as to select the predefined number of base station sets from the plurality of base station sets.

5. The method of claim 4, wherein the step of utilizing the GDOP or the WGDOP to process the conversion calculation for the first ANN unit, so as to select the predefined number of base station sets from the plurality of base station sets, further comprises:
    taking the plurality of distance matrixes corresponding to the plurality of base station sets into the first ANN unit after completing the conversion calculation to generate a plurality of output values corresponding to the plurality of base station sets; and
    comparing the plurality of output values to select the predefined number of base station sets from the plurality of base station sets.

6. The method of claim 5, wherein the step of comparing the plurality of output values to select the predefined number of base station sets from the plurality of base station sets comprises:
    sequentially arranging the plurality of output values to select the smallest three of the plurality of output values, so as to select the predefined number of base station sets.

7. The method of claim 1, wherein the step of utilizing the second ANN unit to position the mobile device according to the predefined number of base station sets comprises:
    utilizing a geometric dilution of precision (GDOP) or a weighted geometric dilution of precision (WGDOP) to process a conversion calculation for the second ANN unit; and
    taking the predefined number of base station sets into the second ANN unit after completing the conversion calculation to position the mobile device.

8. The method of claim 7, wherein the step of taking the predefined number of base station sets into the second ANN unit after completing the conversion calculation to position the mobile device comprises:
    utilizing a scaled conjugate gradient (SCG) algorithm to position the mobile device.

9. The method of claim 1, wherein the first ANN unit and the second ANN unit both comprise an input layer, a hidden layer and an output layer.

10. The method of claim 9, wherein the hidden layer further comprises a plurality of hidden sub-layers and a plurality of hidden neurons, and a plurality of epochs are utilized to determine a conversion period of the first ANN unit and the second ANN unit.

11. The method of claim 1, wherein the method is utilized in a global positioning system (GPS), a cellular communication system, a wireless sensor network (WSN) or a femtocell.

12. The method of claim 11, wherein the base stations comprises seven base stations, and one of the seven base stations is a serving base station when being utilized in the cellular communication system.

13. The method of claim 12, further being utilized in a three dimensional space or a two dimensional space, and the step of selecting a predefined number of base station sets from the plurality of base station sets comprises:
  selecting three from six base stations, not including the serving base station, of the seven base stations so as to combine the three base stations with the serving base station to be one of the plurality of base station sets.

14. A method for selecting a plurality of base stations to position a mobile device comprising:
  forming y base station combinations from n base stations taken r base stations at a time, where $y=C_r^n$, and taking the y base station combinations as a plurality of base station sets, each base station set corresponding to a respective distance matrix comprising a plurality of vectors each between the mobile device and a respective one of base stations in the base station set;
  utilizing a geometric dilution of precision (GDOP) or a weighted geometric dilution of precision (WGDOP) to process a conversion calculation for a first artificial neural network (ANN) unit so as to select a predefined number of base station sets from the plurality of base station sets according to a plurality of distance matrixes corresponding to the plurality of base station sets; and
  utilizing a GDOP or a WGDOP to process a conversion calculation for a second ANN unit so as to position the mobile device according to the predefined number of base station sets.

15. The method of claim 14, wherein the predefined number is three.

16. The method of claim 15, wherein the predefined number of base station sets comprises at least five base stations without repetition.

17. A computer system comprising:
  a central processing unit;
  a detection module coupled to the central processing unit for detecting a plurality of base stations neighboring to the computer system; and
  a storage device coupled to the central processing unit for storing a software and
  a programming code, wherein the programming code is utilized to instruct the central processing unit to process the method for selecting the plurality of base stations to position the mobile device of claim 1.

* * * * *